United States Patent Office   3,336,357
Patented Aug. 15, 1967

3,336,357
α-ALKENYLBENZYLIDENE-MALONONITRILES
Albert F. Strobel, Delmar, and Sigmund C. Catino, Castleton, N.Y., assignors to General Aniline & Film Corporation, New York, N.Y., a corporation of Delaware
No Drawing. Filed Mar. 19, 1965, Ser. No. 441,359
16 Claims. (Cl. 260—465)

This application is a continuation-in-part of application Ser. No. 138,575, filed Sept. 18, 1961, now abandoned.

This invention relates to new and useful substituted α-alkenylbenzylidenemalononitriles and processes for preparing same.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the ultraviolet region close to the visible spectrum, namely, in the wave length region of 3000 to 3800 A. The compounds of this invention even though they exhibit outstanding absorbing properties close to the visible region of the electro-magnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful substituted derivaties of α-alkenylbenzylidene-malononitriles.

It is a still further object of this invention to provide new and useful substituted α-alkenylbenzylidene-malononitriles exhibiting outstanding ultra-violet absorbing properties.

It is another object of this invention to provide processes for the preparation of new and useful substituted derivatives of α-alkenylbenzylidene-malononitriles.

It is still another object of this invention to provide processes for the preparation of new and useful substituted derivatives of α-alkenylbenzylidene-malononitriles exhibiting outstanding ultra-violet absorbing properties.

Other objects and advantages will appear hereinafter as the description proceeds.

The new and useful compounds of this invention are characterized by the following general formula:

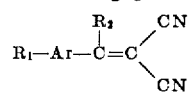

wherein Ar represents a benzenenucleus devoid of azo and nitro as well as amino and more than one oxy group bound directly to Ar and containing as a substituent, $R_1$, which is one of the following:

hydroxy alkoxy ($C_1$ to $C_{30}$)
alkenoxy ($C_3$ to $C_{30}$)
aralkoxy (Ar-alk-o-) wherein Ar is an aryl moiety, e.g., phenyl, substituted phenyl and alk is $C_1$ to $C_{30}$ alkyl residue)
phenyl
substituted phenyl, e.g.,
    halopenyl
    alkoxy phenyl
    cyanophenyl
    carboxy phenyl
    alkyl phenyl
    carbalkoxy phenyl
    acyloxy phenyl
    hydroxyalkoxyphenyl
    carboxamidophenyl
    sulfonamidophenyl
naphthyl
substituted naphthyl (substitute dsimilarly as phenyl)
phenoxy and
substituted phenoxy (substituted similarly as phenyl);
and $R_2$ is alkenyl of from 3 to 30 carbon atoms.

The benzene nucleus Ar may contain in addition to one of the above enumerated $R_1$ groups, further substituents, $(X_1)_n$, which is a non-auxochromic group and has a bathochromism of less than 250 A. Since the utility of the subject compounds is dependent in the main upon a lack of color, any grouping or substituent which increases the wave-length of the peak absorption point more than 250 A. is to be avoided since this will shift such absorption into the visible region, that is, beginning at about 3600 to 4000 A. The groupings to be specifically avoided, therefore, as substituents for $X_1$ are nitro (often classified as a chromophore but for the purposes of this categorization, auxochromic or bathochromic, is definitive), oxy, i.e., —O—, amino, i.e., —N< and azo. All other groupings are satisfactory although some may have a bathochromic effect but nevertheless not as much as 250 A. Such substituents as suitable include:

halo (e.g., —F, —Cl, —Br, —I)
alkyl (e.g., $C_1$ to $C_{30}$)
alkenyl (e.g., $C_3$ to $C_{30}$), and substituted derivatives (e.g., hydroxy, halo, cyano, alkoxy, carboalkoxy, and the like) of said alkyl and alkenyl groups aryl (e.g., phenyl, naphthyl as well as the substituted forms shown above for $R_1$)

alkyl sulfonyl (e.g., $CH_3SO_2$—. $C_2H_5SO_2$— up to $C_{30}$ alkyl sulfonyl)

carbalkoxy (i.e., —COO alkyl wherein alkyl is from 1 to 30 carbon atoms)

carbaryloxy (i.e., —COOAr wherein Ar is phenyl, substituted phenyl, naphthyl and substituted naphthyl suitable as $R_1$ described above)

—$SO_2R$ and $$-O-\underset{\underset{O}{\|}}{C}-R$$

wherein R is alkyl from $C_1$ to $C_{30}$, alkenyl of $C_3$ to $C_{30}$ and Ar as defined above, and n is an integer from 0 to 4.

As suitable $R_1$ substituents, there may be employed in addition to hydroxyl, phenyl, and phenoxy, the following:

| | |
|---|---|
| methoxy | dodecenyl-2-oxy |
| ethoxy | octadecenyloxy |
| n-propoxy | docosenyloxy |
| iso-propoxy | pentamethyl eicosenyloxy |
| n-butoxy | benzyl |
| iso-butoxy | p-chlorobenzyl |
| t-butoxy | p-cyanobenzyl |
| n-amyloxy | p-carboethoxybenzyl |
| iso-amyloxy | p-sulfonamidobenzyl |
| n-hexyloxy | phenethyl |
| n-octyloxy | p-chlorophenethyl |
| iso-octyloxy | p-cyanophenyl |
| n-nonyloxy | 1-bromo-2-methyl phenyl |
| iso-nonyloxy | 1-chloro-2-methyl phenyl |
| n-decoxy | 1-butyl-2-methyl phenyl |
| n-lauryloxy | 4-chloro-1-methyl phenyl |
| stearyloxy | 1-methyl-2-sulfonamido phenyl |
| eicosyl-1-oxy | |
| pentacosyloxy | p-bromobenzyl |
| myresyloxy | phenoxymethyl |
| allyloxy | o-chlorophenyl |
| methallyloxy | p-chlorophenyl |
| crotyloxy | m-chlorophenyl |
| pentenyl-1-oxy | p-bromophenyl |
| β-ethyl-3-propyl allyloxy | o, p and m-tolyl |
| 2-methyl-octenyl-6-oxy | chlorotolyls, |
| decenyl-1-oxy | bromotolyls |
| decenyl-2-oxy | carboxamidophenyl |
| undecenyloxy | |

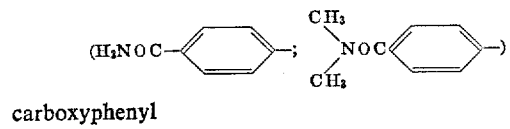

carboxyphenyl

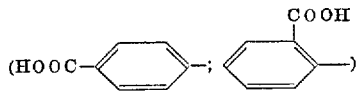

carboxytolyls
alkoxyphenyl

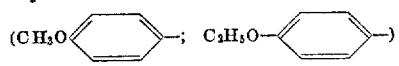

sulfamidophenyl

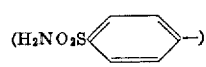

methylsulfonylphenyl

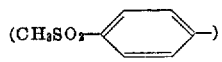

carboacyloxyphenyl

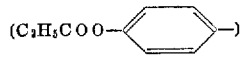

hydroxyalkoxyphenyl

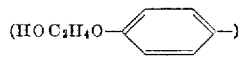

α-naphthyl
β-naphthyl
2-chloro-1-naphthyl
2-carboethoxy-1-naphthyl and the corresponding oxy compounds, e.g.,

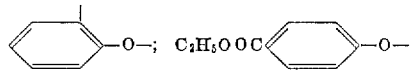

In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. From 1 to about 100 moles of oxyalkylating agent may be used.

Specific ketones which may be employed include the following:

2'allyloxy-5'-fluoro-crotonophenone
2-bromo-4'-phenyl-crotonophenone
5'-fluoro-2'-hydroxy-crotonophenone
4'-hydroxy-crotonophenone
4'-hydroxy-3-methyl-crotonophenone
4'-methoxy-crotonophenone
4'-phenyl-crotonophenone
5'-bromo-2'-hydroxy-crotonophenone
4'-bromo-3'-methoxy-4-phenyl-crotonophenone
3-butylamino-2'-hydroxy-crotonophenone
3-butylamino-2'-hydroxy-5'-methyl-crotonophenone
5'-tert.butyl-2'-hydroxy-3-methyl-crotonophenone
5'-tert.butyl-2'-hydroxy-crotonophenone
5'-chloro-2'-hydroxy-3-methyl-crotonophenone
5'-(1,1-dimethylpropyl)-2'-hydroxy-crotonophenone
5'-(1,1-dimethylpropyl)-2'-hydroxy-3-methyl-crotonophenone
4'-ethyl-2'-hydroxy-crotonophenone
2'-ethyl-6'-hydroxy-4'-methyl-crotonophenone
4'-ethyl-2'-hydroxy-6'-methyl-crotonophenone
2'-hydroxy-crotonophenone
2'-hydroxy-3,5'-dimethyl crotonophenone
2'-hydroxy-3',6'-dimethyl crotonophenone
2'-hydroxy-4',5'-dimethyl crotonophenone
6'-hydroxy-2',3'-dimethyl-crotonophenone
2'-hydroxy-3'-isopropyl-3-methyl-crotonophenone
4'-methoxy-2',3-dimethyl-crotonophenone
4'-methoxy-3'-sulfonamido crotonophenone
3'-cyano-4'-phenyl crotonophenone
3'-methyl-4'-phenoxy crotonophenone
4'-(4-chlorophenyl) crotonophenone
4'-(4-methylsulfonylphenyl) crotonophenone
3'-cyano-4'-methoxy pentenophenone
4'-ethoxy-β-methylcrotonophenone
2'-hydroxypentenophenone
5'-chloro-2'-hydroxy crotonophenone
4'-methoxy-3-methyl-2-pentenophenone
4'-methoxy-2-hexenophenone
5'-tert.butyl-3'-chloro-2'-hydroxypentenophenone
2'-hydroxy-4',5'-dimethylpentenophenone
2'-phenyl-4-hexenophenone
2'-methoxy-4-heptenophenone
2'-methoxy-6-heptenophenone
2'-methoxy-2-octenophenone The general process for the preparation of the compounds of this invention is well known and involves a condensation of the selected alkenylphenone derivative with malononitrile in a suitable solvent under such conditions that dehydration occurs to form the substituted ethylene. Where the phenyl ring vicinal to the keto group contains additional positive substituents, e.g., —CH₃, it may be desirable to employ in place of malononitrile, cyanoacetamide in the condensation and effect conversion of the amido group to the nitrile by dehydration with from 5 to 10 times by weight based on the weight of amide of phosphorus oxychloride (POCl₃.) The general procedure is to heat the cyanoacetamide for 2–4 hours at about 55–65° C., drown in water and filter. The following example will serve to illustrate the compounds of this invention without being deemed limitative thereof. Parts are by weight unless otherwise indicated.

*Example 1*

Preparation of α-propenyl-2′-hydroxybenzylidene malononitrile:

Into a 500 ml. flask, fitted with a stirrer, thermometer, reflux condenser, water trap and heating mantle, there is charged:

| | | |
|---|---|---|
| 2′-hydroxycrotonophenone | mols | 0.5 |
| Malononitrile | do | 0.5 |
| Ammonium acetate | g | 4.5 |
| Glacial acetic acid | cc | 12.0 |
| Benzene | cc | 250.0 |

This charge is stirred at reflux for 6 hours. The benzene is then distilled off; the residue is diluted with 200 cc. of water and filtered. The solid is powdered and slurried in 100 cc. of water, filtered and washed with 300 cc. of water. The product is then air dried and finally recrystallized from 300 cc. aqueous ethanol (100 cc. alcohol+200 cc. water).

*Example 2*

The product of Example 1 is incorporated into a nitrocellulose lacquer consisting of:

| | Parts |
|---|---|
| 20%: | |
| Nitrocellulose, ½ sec. | 46 |
| Product of Example 1 | 4 |
| Cellolyn 502 (non-drying plasticizing liquid resin of Hercules Powder Co.) | 35 |
| Bibutyl phthalate | 15 |
| 80%: | |
| Butyl acetate | 35 |
| Butanol | 15 |
| Toluene | 50 |

The lacquer is drawn out on a metal plate with a bird film applicator to give a film of 3 mils thickness. A similar film is prepared by drawing out a lacquer formulation similar to the one above but in place of the malononitrile compound, 4 additional parts of nitrocellulose are added. After exposure to light for 100 hours, the film prepared without the malononitrile compound develops a distinct yellow color whereas the film containing this ultra-violet absorber shows no appreciable change.

*Example 3*

The compound of Example 1 is incorporated into a cellulose acetate film as follows:

| | G. |
|---|---|
| Product of Example 1 | 0.375 |
| Ethanol | 3.5 |
| Methyl Cellosolve | 6.5 |
| Ethyl acetate | 9.0 |
| Cellulose acetate dope (3.75 g. cellulose acetate in 22.25 g. acetone) | 26 | are mixed with stirring and a clear solution is obtained. The material is poured into a mold and the solvent is evaporated to give a block of cast material of ⅛ inch thickness. A similar block is prepared in the same manner omitting the malononitrile absorber. The material containing the ultra-violet absorber gives better stability to light food materials stored behind it than the cast block without the ultra-violet absorber.

*Example 4*

Example 1 is repeated using 4′-methoxy-β-methylcrotonophenone in place of 2′-hydroxycrotonophenone.

*Example 5*

1 g. of the product of Example 4 is dissolved in 100 g. of Polylite 8000 (a polyester resin of 30% styrene and 70% glycerylphthalatemaleate) containing 1% benzoyl peroxide. A casting is made between opal glass plates treated with a siloxane mold release agent (DRI-Film SC–87). Between the plates and around the edges thereof a gasket material of Tigon tubing is used. Clamps are employed to hold the plates secure against the gasket. The polyester is poured into the mold and cured as follows: initial oven temperature=65° C. The temperature is raised slowly to 90° C. and held for 1 hour. The temperature is then raised to 120° C. and held for ½ hour to complete the curing cycle. The cast polymer containing the ultra-violet absorber gives outstanding protection against sunlight fading to clothing exhibited behind it. A similar casting free of the absorber gives no protection whatsoever and coloration of the clothing fades particularly.

*Example 6*

Example 1 is again repeated using 2′-hydroxypentenophenone in place of the phenone of Example 1.

*Example 7*

The product of Example 6 is incorporated into a cellulose acetate film as described in Example 3 above. Similar outstanding results are obtained.

*Examples 8–20*

In the following examples, Example 1 is repeated employing the indicated phenones in equivalent amounts in place of the phenone of Example 1.

| Example: | Phenone compound |
|---|---|
| 8 | 5′ - chloro - 2′ - hydroxycrotonophenone. |
| 9 | 4′-methoxy-3 - methyl - 2 - pentenophenone. |
| 10 | 4′-methoxy-2-hexenophenone. |
| 11 | 3′-tert.butyl-3′ - chloro-2′-hydroxypentenophenone. |
| 12 | 2′-hydroxy - 4′,5′ - dimethylpentenophenone. |
| 13 | 2′-phenyl-4-hexenophenone. |
| 14 | 2′-methoxy-2-octenophenone. |
| 15 | 2′-methoxy-4-heptenophenone. |
| 16 | 4′-ethoxy-β-methylcrotonophenone. |
| 17 | 2′ - hydroxy-4′ - sulfamido-crotonophenone. |
| 18 | 2′-(o-carboxy - phenyl)-crotonophenone. |
| 19 | 2′-methoxy-5′ - sulfamido - crotonophenone. |
| 20 | 2′-hydroxy - butenephenone - allyl - (2-OH-phenyl)ketone. |

*Example 21*

The compound of Example 18 is oxyalkylated with ethylene oxide in the following manner. To one mole of said product there is added 1.5% by weight based on the weight thereof of potassium hydroxide and then 6 moles of ethylene oxide are added while maintaining the mixture in an autoclave at 80° C. The product as the following formula:

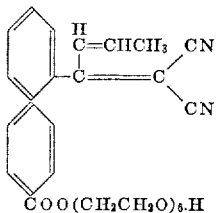

*Example 22*

The procedure of Example 21 is repeated employing 12 moles of ethylene oxide.

*Example 23*

The procedure of Example 21 is again repeated employing 35 moles of ethylene oxide.

*Example 24*

The procedure of Example 21 is repeated using 8 moles of propylene oxide.

*Example 25*

The product of Example 24 is further treated with 6 moles of ethylene oxide.

*Example 26*

Each of the examples 21–25 is repeated except that the nitrile used is that of Example 19.

*Examples 27–50*

Example 1 is again repeated employing the following phenones (in equivalent amounts) in place of the one used in Example 1:

| Example: | Phenone compound |
|---|---|
| 27 | 3'-methyl - 4'-phenoxy crotonophenone. |
| 28 | 2'-allyloxy-5' - fluoro crotonophenone. |
| 29 | 4'-(4 - chlorophenyl) crotonophenone. |
| 30 | 4'-(4-methylsulfonyl phenyl) crotonophenone. |
| 31 | 3'-cyano-4'-methoxy pentenophenone. |
| 32 | 2'-(p - carbethoxyphenyl) crotonophenone. |
| 33 | 2'-(p - carboxamidophenyl) crotonophenone. |
| 34 | 2'-(p-N,N - dimethyl carboxamidophenyl) crotonophenone. |
| 35 | 2'-dodecyloxy crotonophenone. |
| 36 | 4'-pentacosyloxy crotonophenone. |
| 37 | 2'-octadecenyloxy crotonophenone. |
| 38 | 4'-(p-methoxyphenyl) crotonophenone. |
| 39 | 4'-(p-cyanophenyl) crotonophenone. |
| 40 | 4'-(3,5 - dimethyl phenyl) crotonophenone. |
| 41 | 4'-(α-naphthyl) crotonophenone. |
| 42 | 4'-(p-chlorophenoxy) crotonophenone. |
| 43 | 4'-(3,5 - dimethylphenoxy) crotonophenone. |
| 44 | 4'-(o-cyanophenoxy) crotonophenone. |
| 45 | 2'-(3 - sulfamidophenoxy) crotonophenone. |
| 46 | 4'-(3 - carbopropoxyphenoxy) crotonophenone. |
| 47 | 3'-methyl-4'-(4 - carbophenoxyphenyl) crotonophenone. |
| 48 | 2'-(3-isopropylsulfonylphenyl) crotonophenone. |
| 49 | 4'-(p-N-ethylsulfamidophenyl) crotonophenone. |
| 50 | 3'-ethyl-4'-methoxy - 5' - bromo crotonophenone. |

The compounds of this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers of this invention can be used not only to stabilize clear films, plastics, and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds of this invention give outstanding protection to paint, enamel and varnish films against fading of pigments and dyes contained therein. The most outstanding and significant achievement of the compounds of this invention lies in the remarkable ability of these compounds to protect and stabilize polyoxymethylene and nitrocellulose containing compositions against ultra-violet light degradation. The compounds of this invention have been found to be at least five times as effective in such stabiliizng situations as the heretofore employed hydroxybenzophenones known for such uses.

The compounds of the present invention have also been found to be admirably suited for incorporation into the transparent backings of the various pressure sensitive type adhesive types presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Example 2. For direct incorporation into a film of regenerated cellulose, one may employ any of the compounds herein disclosed and particularly those which have been polyoxyalkylated as described, for example, in Example 23. In this instance, it is preferred to impregnate regenerated cellulose in the gel state before final drying thereof.

The instant compounds which do not contain free hydroxyl groups, i.e., phenolic hydroxyls, are completely insensitive to alkali and thus can be used in alkaline systems and in particular alkaline plastics such as epoxy resins, Formica, etc. whereas the previously used hydroxybenzophenones absolutely require phenolic hydroxyls for effective stabilization, and these cannot so be used. Among other plastic materials which may be stabilized, mention may be made of polyethylene, cellulose acetate, cellulose ethers, polyvinylchloride, vinyl chloride vinylacetate copolymers, polystyrene, styrene-butadiene copolymers, cellulose, regenerated cellulose, acrylate polymers, methacrylate polymers, polyvinyl ethers and ketones, halogenated polyethylenes, e.g., polytetrafluoroethylene, and the like.

Other variations in and modifications of the described processes which will be obvious to those skilled in the art can be made in this invention without departing from the scope or spirit thereof.

We claim:
1. An essentially colorless compound devoid of azo and nitro groups of the formula:

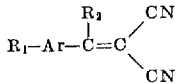

wherein
(A) Ar represents a monocyclic benzene nucleus devoid of (a) nuclear bonded amino groups (b) more than one $R_1$ group, and (c) more than one oxy group;
(B) $R_1$ is a radical selected from the class consisting of hydroxy, phenyl, phenoxy, halo phenyl, alkyl phenyl, alkoxy phenyl, cyano phenyl, carboxy phenyl, carbalkoxy phenyl, hydroxyalkoxy phenyl, carbophenoxy phenyl, sulfamido phenyl, alkyl sulfonyl phenyl, carboxamido phenyl, halo phenoxy, cyano phenoxy, alkyl phenoxy, sulfamido phenoxy and carboalkoxy phenoxy; and
(C) $R_2$ is an alkenyl radical of from 3 to 30 carbon atoms.

2. An essentially colorless compound devoid of azo and nitro groups of the formula:

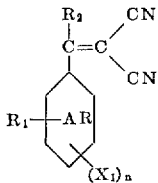

wherein
(A) The AR ring represents a benzene ring which is devoid of nuclear bonded amino groups;
(B) $R_1$ is a radical selected from the class consisting of hydroxy, phenyl, phenoxy, halo phenyl, alkyl phenyl, alkoxy phenyl, cyano phenyl, carboxy phenyl, carbalkoxy phenyl, hydroxyalkoxy phenyl, carbophenoxy phenyl, sulfamido phenyl, alkyl sulfonyl phenyl, carboxamido phenyl, halo phenoxy, cyano phenoxy, alkyl phenoxy, sulfamido phenoxy and carboalkoxy phenoxy;
(C) $R_2$ is an alkenyl radical of from 3 to 30 carbon atoms;
(D) $X_1$ is a non-auxochromic substituent having a bathochromism of less than 250 A.; and
(E) $n$ is an integer from 0 to 4.

3. A compound as defined in claim 1 wherein $R_1$ is hydroxy and $R_2$ is propenyl.
4. A compound as defined in claim 1 wherein $R_1$ is hydroxy and $R_2$ is allyl.
5. A compound as defined in claim 1 wherein $R_1$ is alkoxy and $R_2$ is propenyl.
6. A compound as defined in claim 1 wherein $R_1$ is alkoxy and $R_2$ is allyl.
7. A compound as defined in claim 1 wherein $R_1$ is phenyl and $R_2$ is propenyl.
8. A compound as defined in claim 1 wherein $R_1$ is phenyl and $R_2$ is allyl.
9. A compound as defined in claim 1 wherein $R_1$ is phenoxy and $R_2$ is propenyl.
10. A compound as defined in claim 1 wherein $R_1$ is phenoxy and $R_2$ is allyl.

11. A compound of the formula:

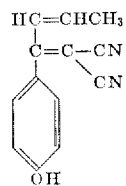

12. A compound of the formula:

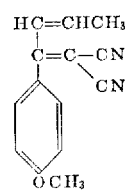

13. A compound of the formula:

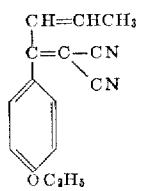

14. A compound of the formula:

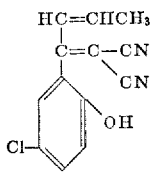

15. A compound of the formula:

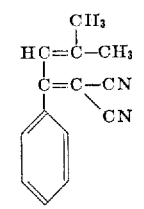

16. A compound of the formula:

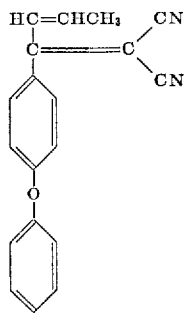

No references cited.

CHARLES B. PARKER, *Primary Examiner.*
JOSEPH P. BRUST, *Examiner.*
D. R. MAHANAND, *Assistant Examiner.*